(12) United States Patent
Nelson

(10) Patent No.: US 7,607,871 B1
(45) Date of Patent: Oct. 27, 2009

(54) SPRING LOADED TOOL WITH FLOATING DEPTH CONTROL FOR COUNTERSINKING HOLES OR ENGRAVING

(76) Inventor: Lance Nelson, 5 Rock Ave., Hudson, MA (US) 01749

( * ) Notice: Subject to any disclaimer, the term of this patent is extended or adjusted under 35 U.S.C. 154(b) by 191 days.

(21) Appl. No.: 11/732,891

(22) Filed: Apr. 5, 2007

(51) Int. Cl.
B23B 49/00 (2006.01)

(52) U.S. Cl. .................. 408/113; 408/110; 408/202; 408/241 S

(58) Field of Classification Search .......... 408/84, 408/110–113, 202, 241 S
See application file for complete search history.

(56) References Cited

U.S. PATENT DOCUMENTS

| 2,192,528 | A |   | 3/1940  | Schmidt          |         |
|-----------|---|---|---------|------------------|---------|
| 2,383,854 | A | * | 8/1945  | Gwinn, Jr. et al.| 408/112 |
| 2,408,652 | A | * | 10/1946 | King             | 408/113 |
| 2,422,279 | A |   | 6/1947  | Zimmer           |         |
| 2,477,891 | A | * | 8/1949  | O'Neill          | 408/113 |
| 2,905,030 | A | * | 9/1959  | Cogsdill         | 408/112 |
| 2,915,925 | A | * | 12/1959 | Nipken           | 408/113 |
| 3,028,774 | A | * | 4/1962  | Hausser et al.   | 408/112 |
| 3,126,793 | A | * | 3/1964  | Jennings et al   | 409/125 |
| 3,320,832 | A | * | 5/1967  | Jensen           | 408/112 |
| 3,689,171 | A | * | 9/1972  | Bouzounie        | 408/112 |
| 4,115,017 | A | * | 9/1978  | Wilhelmsson      | 408/14  |
| 5,051,043 | A | * | 9/1991  | Spitznagel       | 408/72 R|
| 5,066,172 | A |   | 11/1991 | Swim, Jr.        |         |
| 6,834,434 | B2|   | 12/2004 | Nelson           |         |
| 7,093,368 | B1|   | 8/2006  | Nelson           |         |

FOREIGN PATENT DOCUMENTS

| DE | 552110     |    | * | 6/1932  |
|----|------------|----|---|---------|
| DE | 2514064    | A1 | * | 10/1976 |
| DE | 10154434   | A1 | * | 6/2003  |
| GB | 560507     |    | * | 4/1944  |
| GB | 2269333    | A  | * | 2/1994  |

* cited by examiner

Primary Examiner—Daniel W Howell
(74) Attorney, Agent, or Firm—Robert Nathans

(57) ABSTRACT

A floating tool-bit depth controlling nosepiece for a spring loaded tool holder is used to countersink holes of equal size when the height of the work piece material changes. The floating tool-bit depth controlling nosepiece, driven by a cnc machine, is rigidly coupled to the floating portion of the tool holding element. The floating depth controlling nosepiece has a bearing on the end to allow an area of the nosepiece to stop rotating when the nosepiece is pressed against the work-piece surface. Since the area of the nosepiece that comes into contact with the work-piece is no longer spinning in relationship with the work-piece, the possibility of scratching the work-piece surface is reduced. Additionally, the nosepiece has cut-outs therein to expel machined chips during countersinking of holes.

20 Claims, 6 Drawing Sheets

SPRING LOADED TOOL WITH FLOATING DEPTH CONTROL FOR COUNTERSINKING HOLES OR ENGRAVING

BACKGROUND OF THE INVENTION

The present invention relates to the field of toolholders for the computer numerically controlled (cnc) machining industry.

The typical method of controlling the depth that a cutting tool is able to plunge into a material being machined is by placing the cutting tool in a rigid toolholder and using the computer controlled axis to plunge the tool to a predetermined depth. The operator of the cnc machine programs the machine to plunge the tool to the desired depth. If the part is perfectly flat and the exact location of the top surface of the work-piece is known, then this method works very well. However, when the material is not perfectly flat or when the top surface of the work-piece is not precisely known, then this method is unacceptable.

Two specific processes, engraving and countersinking holes, are very susceptible to variations in the work-piece surface. If the work-piece surface is uneven and the above mentioned method of controlling depth is used to perform engraving, the width of the engraved line appears uneven and often leads to tool breakage due to the tool tip plunging too far into the surface of the material being engraved. If the above method is used to perform countersinking of holes, then the diameter of the countersunk hole being produced may be incorrect. The purpose of the countersunk hole is to allow a screw head to be perfectly flush with the work-piece surface. If the countersunk hole is too deep, the top of the screw will be below the work-piece surface and if the countersunk hole is too shallow, the top of the screw will be above the work-piece surface. The aerospace industry is one place where the diameter of the countersunk hole is critical. Screws are placed onto the surface of the wings to hold the sheetmetal skin surface to the frame. The screws need to be perfectly flush so they do not affect wind resistance.

Devices are available which limit the amount of the tool tip exposed to the work-piece. These devices are intended to be rotated in a spindle of a manually operated machine such as a drill press or hand drill where the operator controls when to stop the downward motion of the tool against the work-piece. These devices have a hard stop which limits the amount the spindle can be moved toward the work-piece. Instead of a cnc controller defining when to stop the downward motion of the spindle and the tool towards the work-piece, the hard stop contacts the surface of the work-piece and will not allow the spindle to be moved any closer to the work-piece.

Mercier U.S. Pat. No. 6,474,450, Zimmer U.S. Pat. No. 2,422,279, Swim, Jr. U.S. Pat. No. 5,066,172, Schmidt U.S. Pat. No. 2,216,988 and Schmidt U.S. Pat. No. 2,192,528 all describe devices that utilize hard stops to control the downward motion of the tool into the work-piece. None of these devices could be used in a cnc machine where the computer control determines when to stop the downward movement of the spindle towards the work-piece. If any of these devices were placed in the spindle of a cnc machine and plunged into the work-piece, the cnc machine would simply crush the hard stop against the work-piece surface and damage the tool, the workpiece, and possibly the cnc machine. The cnc machine would need to stop the downward motion of the tool before it reached the hard stop which would negate the use of the device in the first place.

Nelson U.S. Pat. No. 6,834,434 and Nelson U.S. Pat. No. 7,093,368 describe a Spring Loaded Engraving Tool and one with a Depth Controlling Nosepiece respectively, which effectively solves the problem of an irregular work-piece surface when engraving is performed using a cnc machine. A spring is used to press an engraving tool into the work-piece surface so it is not critical to know the precise location of the work-piece surface. To absolutely control the depth of engraving, a nosepiece may be attached to the front of the Spring Loaded Engraving Tool to only allow a specific length of the tool to protrude from the end. Then, when the tool is plunged down into the work-piece, the tool tip is only able to penetrate the work-piece surface by a specific amount. There is no hard stop limiting the distance the spindle can be plunged into the work-piece surface. The spring will simply compress further while the nosepiece remains biased against the work-piece.

BRIEF SUMMARY OF PREFERRED EMBODIMENTS OF THE INVENTION

The objectives set forth above are met in accordance with the present invention, whereby a depth controlling nosepiece is attached to a spring loaded toolholder to allow engraving or countersinking holes to a defined depth. Although the devices of my aforesaid patents work well for engraving and would also work for countersinking holes, several modifications are provided in accordance with the present invention which significantly improves the devices. First, the nosepiece is modified so it has large cutout areas surrounding the tool-bit. This provides room for the larger chips that are created when countersinking holes to be expelled from the internal area of the nosepiece to prevent damage to the work-piece. Additionally, a bearing may be placed on the end of the nosepiece so that when the nosepiece is pressed against the work-piece, the bearing rotates so that the nosepiece portion pressed against the work-piece does not continue spinning. This prevents scratching of delicate work-pieces particularly if the rotating nosepiece portion is left pressed against the work-piece for an extended period of time while the hole is countersunk.

In accordance with another optional feature, the main cylindrical outer body of the toolholder containing the tool bit holding mechanism, and the tool bit depth limiting nosepiece are directly rotatably screw coupled together, thereby to permit adjustment of the tool protrusion distance out of the nosepiece by rotating it, and at the same time reducing the overall length of the toolholder. This reduction in the overall length of the toolholder allows the toolholder to be used on smaller tabletop sized cnc machines which have a very limited distance between the spindle of the cnc machine and the workpiece.

BRIEF DESCRIPTION OF THE DRAWINGS

These and other features and advantages of the present invention may be better understood by reading the following detailed description, taken together with the drawings wherein.

DETAILED DESCRIPTION OF THE PREFERRED EMBODIMENTS OF THE INVENTION

Figure 1:
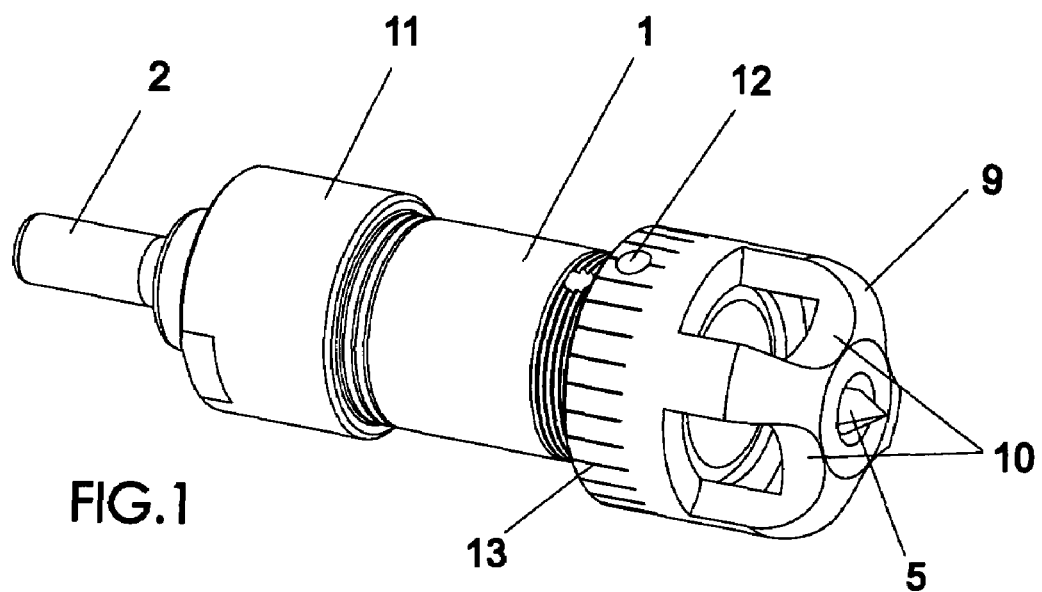
FIG. 1 is a perspective view of the disclosed overall design of the invention.
Figure 2:
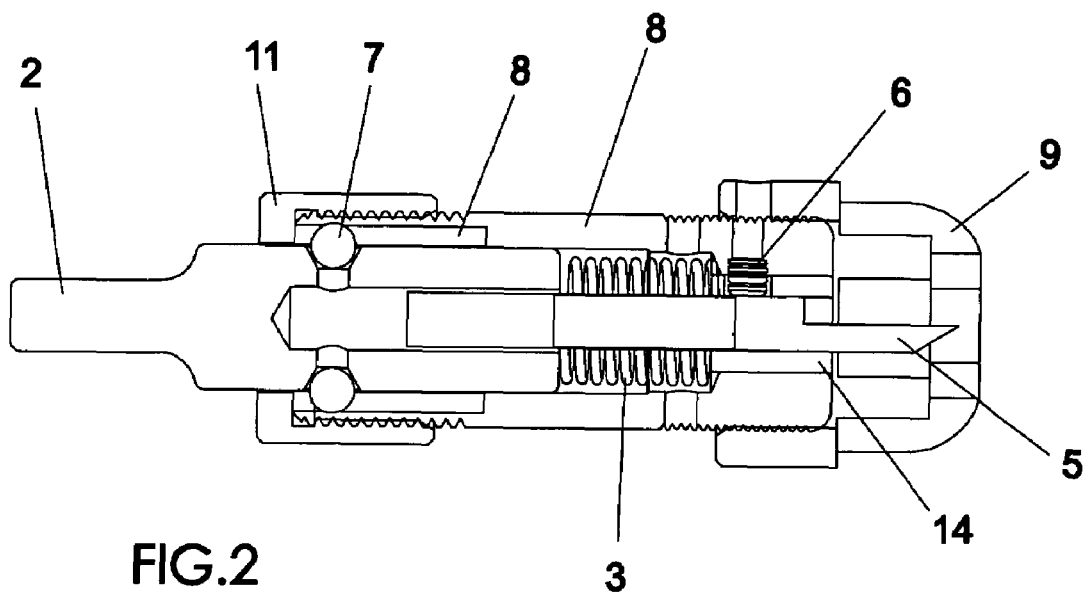
FIG. 2 is a cross sectional view of FIG. 1.
Figure 3:
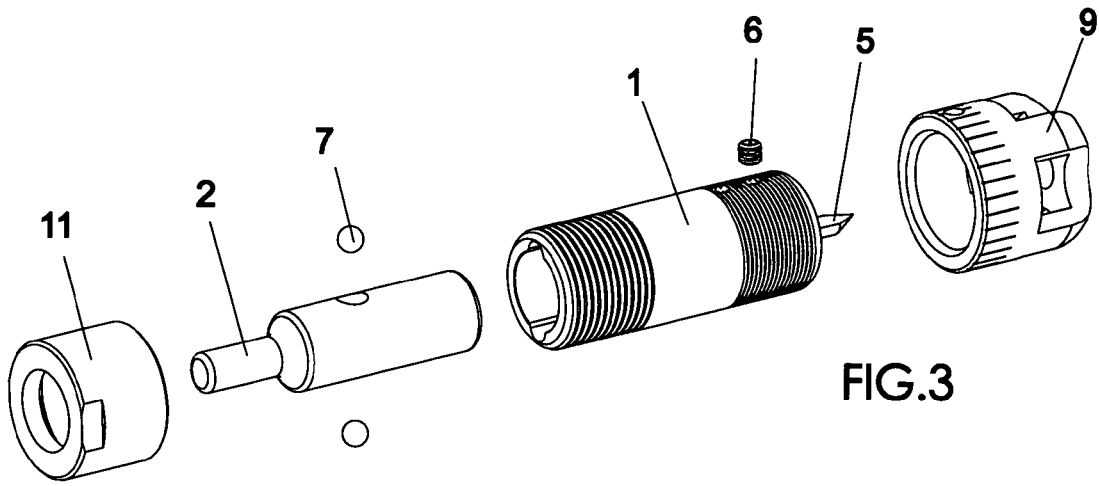
FIG. 3 is an exploded perspective view of FIG. 1.
Figure 4:
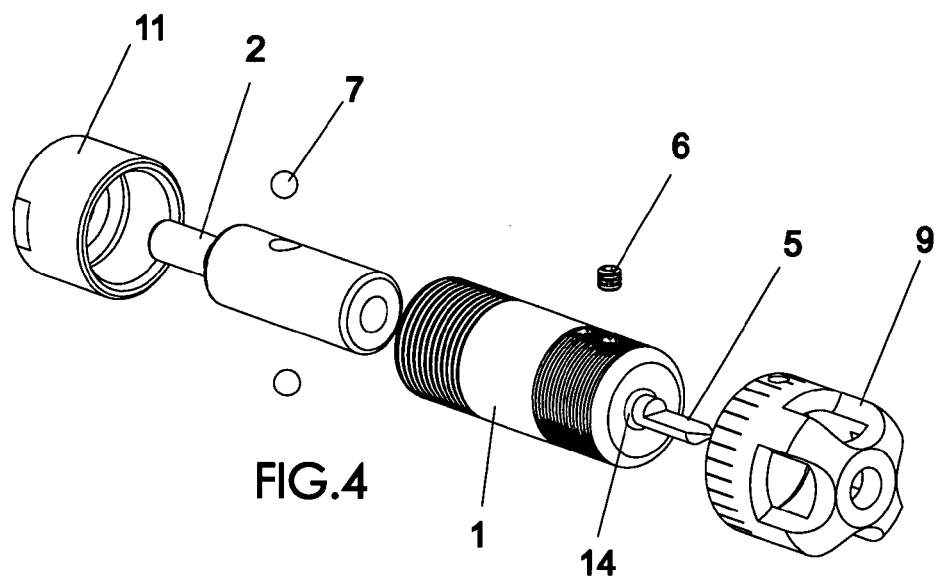
FIG. 4 is a rotated exploded perspective view of FIG. 1.

FIGS. 1 and 2 show a spring loaded toolholder which is designed to be held in the spindle of a cnc machine via a collet, endmill holder, or other standard holding means. The main body 1 is biased away from the shaft 2 by a spring 3. This provides the biasing means for pressing the tool-bit 5 against the work-piece. An end-cap 11 is threaded onto the back of the main body. A retaining mechanism such as balls 7 which travel in slots is shown that serves a dual purpose: the balls butt up against the end-cap 11 to retain the shaft 2 within the bore of the main body 1, and it also acts as a rotational restraining mechanism which ensures the main body 1 rotates along with the shaft 2 when the shaft slides axially within the bore of the main body. A different mechanism such as a screw protruding through the main body traveling in a slot could also be used but the balls provide for a low friction sliding mechanism which adds very little additional friction when the shaft slides within the bore of the main body. A tool-bit 5 is held in the main body 1 of the spring loaded toolholder via a set screw 6. If desired, tubular shaped bushings 14 of various sizes, or split collets could be inserted into the hole around the tool-bit to allow different diameter tool-bits to be used. The tool-bits can be engraving tools, hole forming tools (such as countersinks, counterbores, drills, spot drills, etc.), de-burring and chamfering tools, that are readily gripped by and readily replaceable within the spring loaded toolholder. All of the tools listed above benefit greatly from the use of a nosepiece added to the spring loaded toolholder. The hole forming tools are prevented from plunging too far into the workpiece and changing the diameter or depth of the hole being created. The de-burring and chamfering tools are prevented from gouging or plunging too deep into the workpiece and changing the appearance of the edges being deburred or chamfered.

Figure 7:
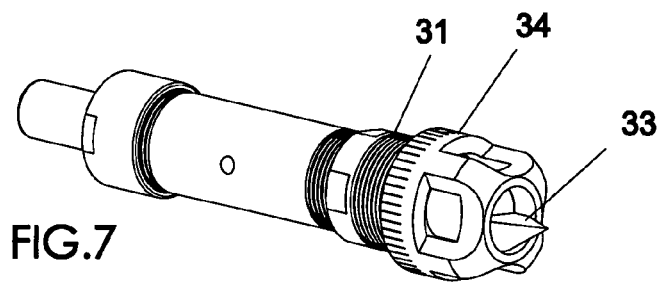
FIG. 7 is a perspective view of an alternate design.

A nosepiece 9 is shown threaded onto the main body 1. Having the nosepiece threads integral to the main body as shown in FIG. 1 instead of on a separate collet nut 31 as shown in FIG. 7 allows for the overall length of the device to be reduced. This allows the device to be used on small tabletop type cnc milling machines where the space between the spindle and the work-piece is very limited.

Figure 5:
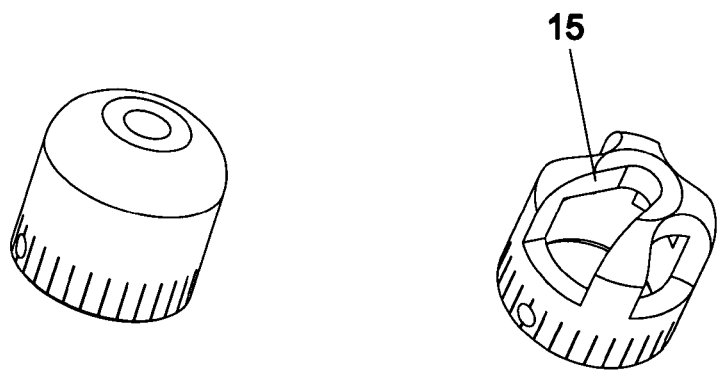
FIG. 5 is a perspective view of a nosepiece.

By manually rotating the nosepiece 9 screw coupled to the main threaded cylindrical body 1, more or less of the tool-bit 5 is exposed from the end of the nosepiece. A setscrew is threaded into a hole 12 in the nosepiece to lock the nosepiece to the main body once the desired amount of the tool-bit is exposed from the end of the nosepiece. Markings 13 are placed on the nosepiece to measure the amount of the tool-bit that is exposed when the nosepiece is rotated. The markings are shown on the nosepiece but they may just as easily be placed on the main body. Typically, each mark would correlate to 0.001" of the tool being exposed. As the nosepiece is rotated one mark, the nosepiece moves in the axial direction by 0.001". The nosepiece has multiple cutouts 10 to allow chips that are produced when the device is used to be expelled from the interior of the nosepiece. If the nosepiece doesn't have any side cutouts like the nosepiece shown in FIG. 5, the large chips created when countersinking holes have a tendency to pack into the nosepiece and need to be periodically removed. The larger the cutouts, the better for chip evacuation. The size of the cutouts is somewhat limited by the strength of the material being used for the nosepiece, if too much material is removed from the nosepiece, it will not have enough strength to withstand being pressed against the work-piece.

Figure 6:
FIG. 6 is a perspective view of a nosepiece showing cutouts on the sides extending to the front of the nosepiece.

FIG. 6 shows one of the cutout areas 15 inserted in the nosepiece extending to the front of the nosepiece. If a single fluted cutting tool-bit shown in FIG. 6 were used, this configuration would allow the cutout area of the nosepiece to be aligned with the cutting edge of the tool-bit so that the chips produced during use would be guaranteed to be expelled from the nosepiece.

Figure 8:
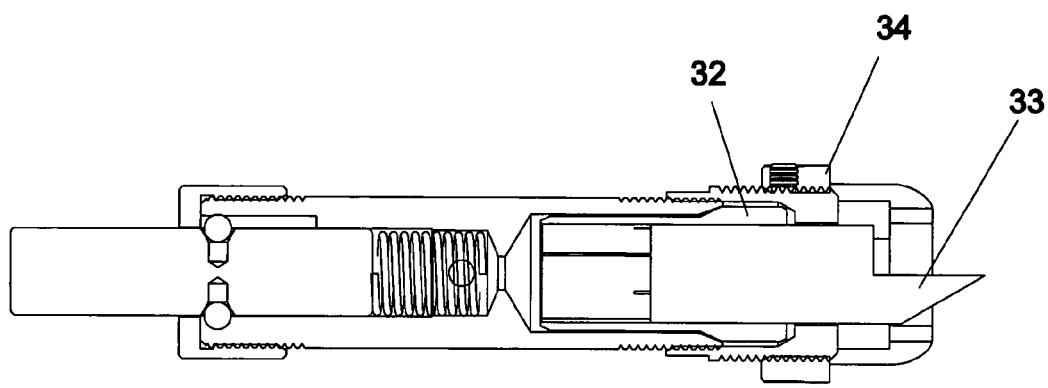
FIG. 8 is a cross sectional view of FIG. 7.
Figure 9:
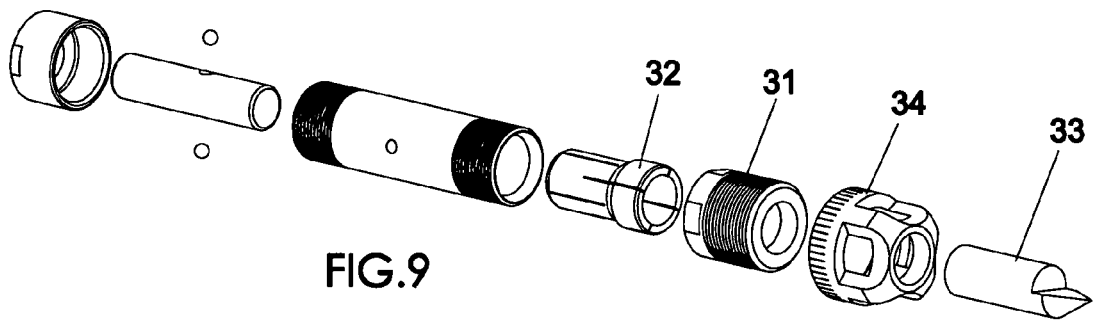
FIG. 9 is an exploded perspective view of FIG. 7.

FIGS. 7, 8, and 9 shows the nosepiece 34 with the cutouts attached to a spring loaded toolholder that uses standard collets 32 as a tool-bit 33 holding mechanism. A collet nut 31 is threaded onto the main body of the spring loaded toolholder. The collet nut serves the dual purpose of compressing the collet 32 to retain the tool-bit 33 and also retains the nosepiece 34 on the toolholder. Again, as the nosepiece 34 is rotated on the collet nut 31, it exposes more or less of the tool-bit from the end of the nosepiece. Although this collet design allows for much easier tool-bit changes than the design shown in FIGS. 1-4, the collet and collet nut protruding from the end of the tool add some additional length which may be problematic for some very small tabletop type cnc milling machines.

The tool-bit holding mechanism provides for holding the widest variety of tool diameters and types. By being able to hold virtually any size or shape tool in the spring loaded device, it allows for other types of operations such as polishing, de-burring, chamfering, and edge breaking to be easily performed. Other tools can be placed in the toolholding mechanism such as tapered, conical, spherical, or various shaped burrs, polishing bobs and wheels, wire brushes, and numerous other type tools. All these tools benefit from the floating action of being pressed against a work-piece by a spring. The nosepiece mechanism, which only allows a certain portion of the tool to protrude from the end of the nosepiece, is very beneficial when an operation like de-burring, chamfering, or edge breaking is being performed on a soft material such as plastic. The nosepiece prevents the de-burring tool from plunging too deep into the material and still allows the tool to follow the contour of the material so the de-burred or chamfered edge appears consistent. Importantly, the tools are quickly and readily interchangeable and replaceable within the spring loaded toolholder.

Figure 10:
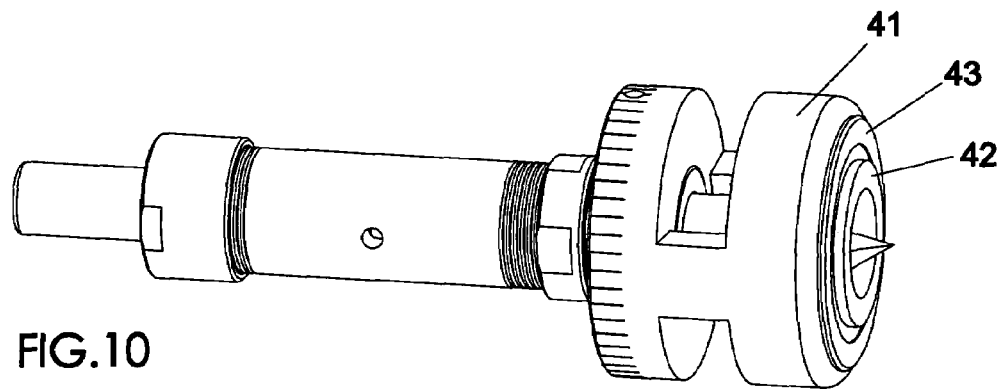
FIG. 10 is a perspective view of an alternate design with a bearing on the nosepiece.
Figure 11:
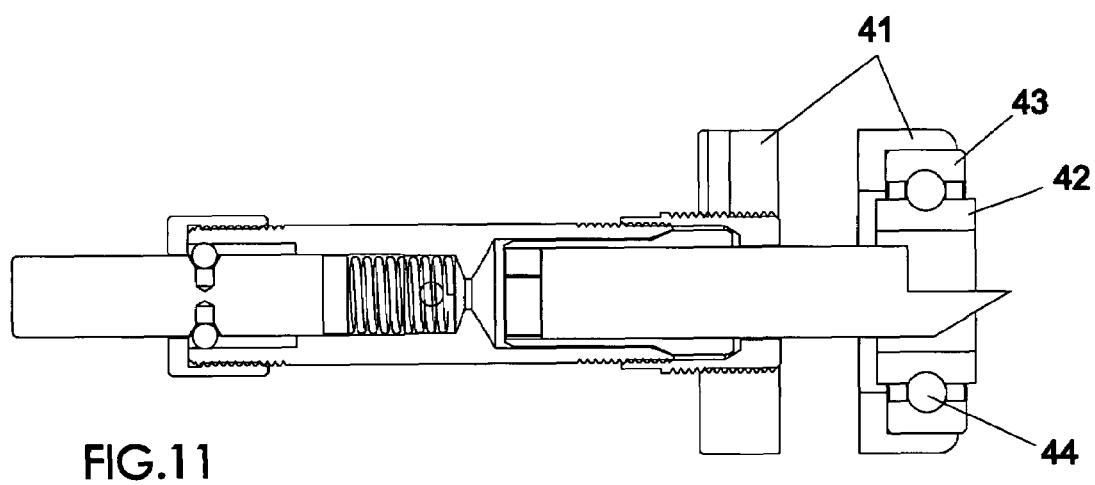
FIG. 11 is a cross sectional view of FIG. 10.
Figure 12:
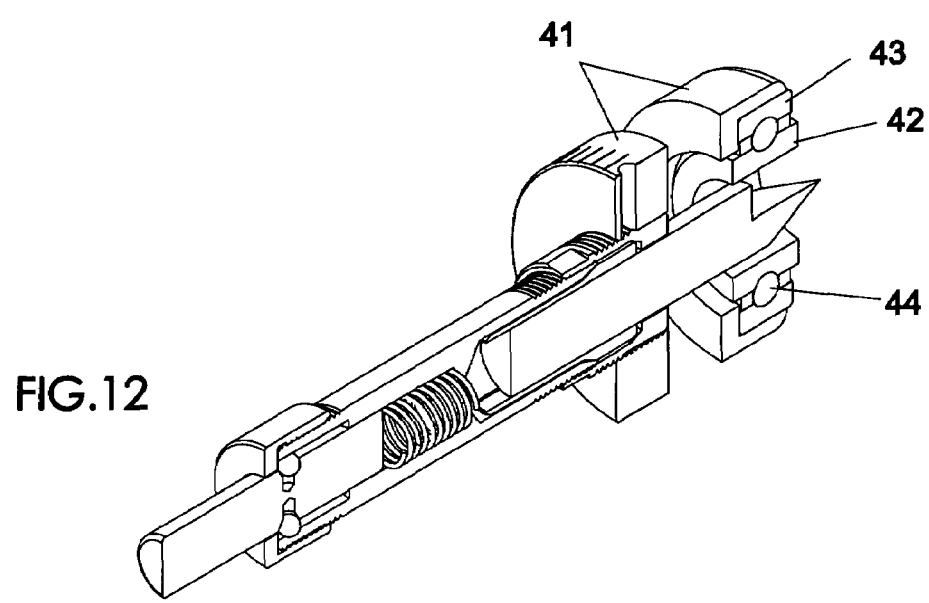
FIG. 12 is a cross sectional perspective view of FIG. 10.

FIGS. 10, 11, and 12 shows a larger nosepiece 41 with a bearing 43 inserted into the end that comes in contact with the work-piece. As the nosepiece 41 is rotated in the spindle of a cnc milling machine and pressed against a work-piece, the inner race of the bearing 42 stops rotating against the work-piece due to the balls 44 within the bearing. This allows the nosepiece 41 to spin with the spring loaded tool but the area contacting the work-piece 42 will remain stationary. This will reduce the possibility of the nosepiece scratching the work-piece, especially if there is a large dwell time when the nosepiece is pressed against the work-piece as may be necessary when countersinking, counterboring, or spot drilling holes to a specific diameter. The tool may be required to dwell for a period of time to ensure the spring has sufficient time to extend to the required depth. The bearing can be inserted into the end of the nosepiece using a standard press fit arrangement or the bearing could be retained with additional holding mechanisms such as a set screw, a spring retaining ring (sometimes referred to as a c-clip), or even an additional threaded cover.

Figure 13:
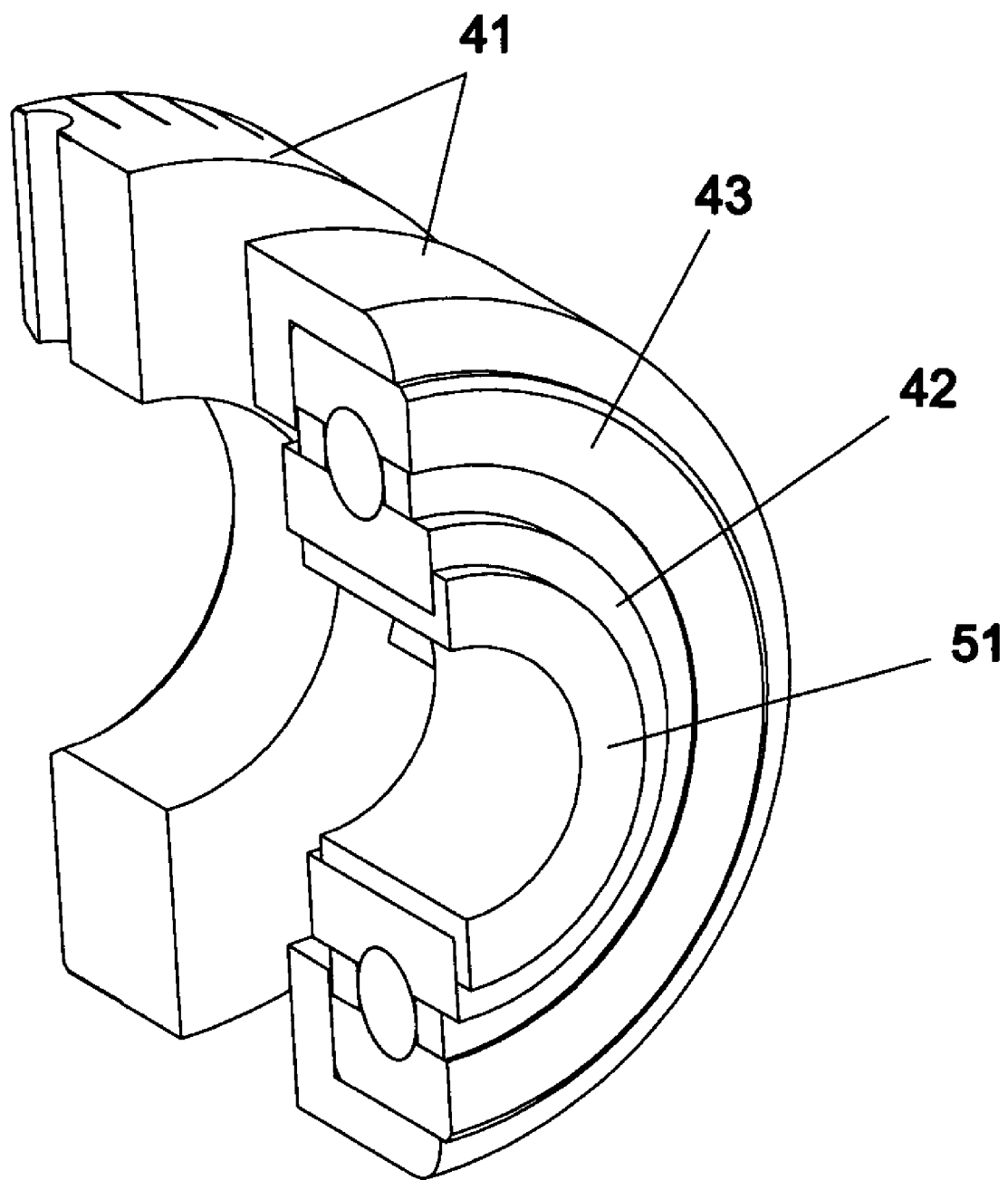
FIG. 13 is a cross sectional perspective view of the nosepiece of FIG. 10 with an additional internal sleeve.

FIG. 13 shows an additional sleeve 51 inserted into the inner race 42 of the bearing 43 that is inserted into the nosepiece 41. This additional sleeve 51 could be made of a soft plastic or metal material which would even further reduce any possibility of scratching the work-piece surface. This additional non-marring sleeve could also be easily changed if wear occurs due to large amounts of use and would be much less costly than the entire nosepiece assembly.

Figure 14:
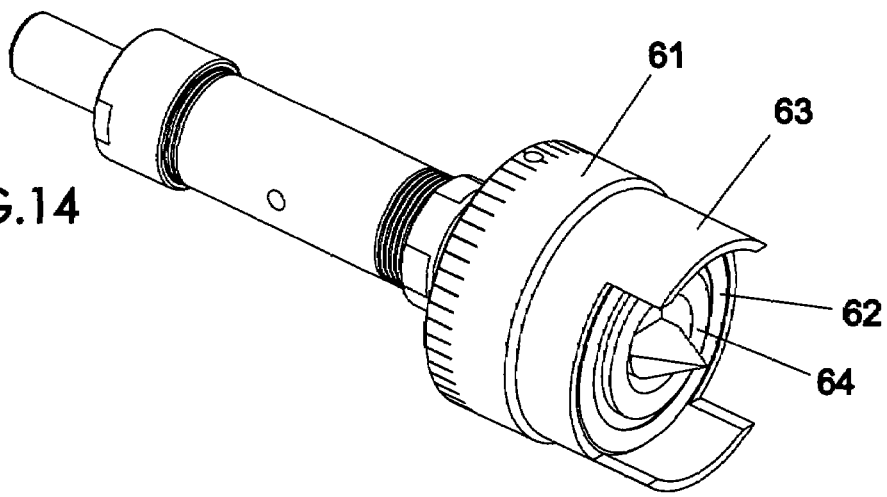
FIG. 14 is a perspective view of an alternate design with a bearing installed on an upper portion of the nosepiece.
Figure 15:
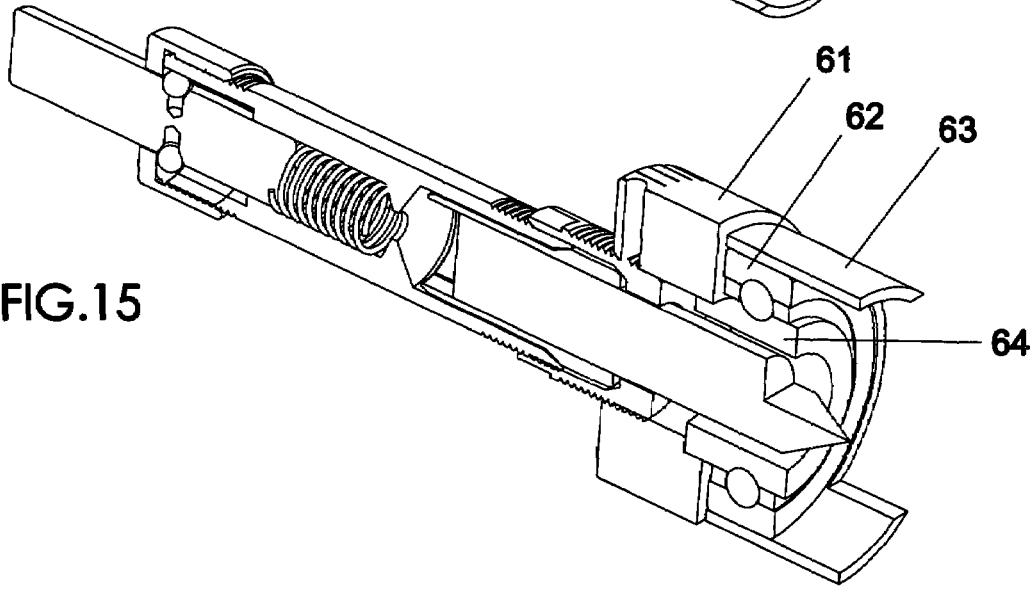
FIG. 15 is a cross sectional perspective view of an alternate design with the bearing located towards the top of the nosepiece.
Figure 16:
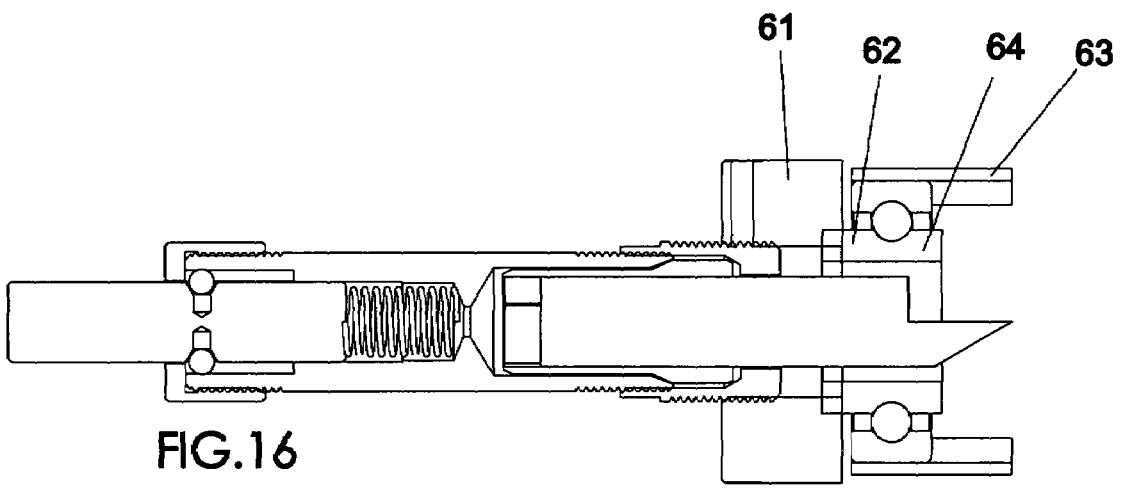
FIG. 16 is a cross sectional view of FIG. 14.

FIGS. 14, 15, and 16 show an alternate design of the nosepiece 61 where the outer race 62 of the bearing with its extended sleeve 63 is located near the top or outer portion of the nosepiece instead of at the bottom near the work-piece. The inner race 64 of the bearing is attached to the nosepiece 61. This could be accomplished by pressing the bearing into a hole in the nosepiece or using another typical bearing mounting technique such as a set screw or a spring retaining ring. The outer race 62 of the bearing is attached to a sleeve 63 that will come in contact with the work-piece during use. The sleeve 63 may have cutouts located in it for the chips to be evacuated during use. Although it is shown as having the inner race of the bearing attached to the upper portion of the nosepiece, it would be just as simple to attach the outer race of the bearing to the upper portion and attach the inner race to the sleeve that contacts the work-piece. This would allow maximum flexibility for sizing the area of the sleeve that contacts the work-piece.

It may now be noted that one specific embodiment of the invention has the following components disclosed in FIGS. 1, 2, and 7.

A rotary tool holder 1 comprising:

(a) a drive shaft 2 configured to be rotated by a machine tool for in turn rotatably driving said rotary tool holder 1;

(b) a tool-bit holding mechanism 6 positioned within said rotary tool holder for positioning a tool-bit 5 within and extending from a tool-bit depth limiting nosepiece 9 that is rigidly axially attached by a first coupling means (31, 34, FIG. 7; set screw 12, FIG. 1) to a forward portion of said rotary tool holder in a manner causing said nosepiece to rotate along with said rotary tool holder;

(c) biasing means 3 for biasing said tool holder and said tool-bit away from said drive shaft in a forward direction extending toward a work-piece;

(d) second coupling means (2, 7, 8, 11) for rotationally coupling the drive shaft to the rotary tool holder while configured to enable a rear portion of said tool-bit to slide axially within a bore of the drive shaft, whereby the tool-bit depth limiting nosepiece, rigidly coupled to said tool holder, is able to slide axially relative to said drive shaft, thus preventing said tool-bit depth limiting nosepiece from functioning as a hard stop; and (e) wherein said second coupling means has longitudinally extending slots 8 for containing balls 7 positioned within said slots, said balls being rotatably coupled to said drive shaft 2, and wherein said second coupling means is configured for retaining said drive shaft within said tool holder (11); and (f) wherein said first coupling means has screw threads (31, 34; FIG. 7) for enabling temporary relative rotation of said nosepiece with respect to a forward position of said tool holder, for providing adjustment of a given desired protrusion distance that said tool-bit is able to protrude from said nosepiece.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as defined by the appended claims. The term "tool-bit" as used herein is intended to cover devices such as those mentioned above that are " . . . shaped to perform a machining operation when clamped on a tool shank or holder" as defined in "Websters Third New International Dictionary, 1981."

What is claimed is:

1. A rotary tool holder comprising:

(a) a drive shaft configured to be rotated by a machine tool;

(b) a tool-bit holding mechanism positioned within said rotary tool holder for positioning a tool-bit within a tool-bit depth limiting nosepiece;

(c) biasing means for biasing said tool-bit holding mechanism away from said drive shaft in a forward direction extending toward a work-piece;

(d) and wherein said tool-bit depth limiting nosepiece has a first coupling means for rigidly attaching said tool-bit depth limiting nose piece to a forward portion of said rotary tool holder in a manner causing said tool-bit depth limiting nosepiece to rotate along with said rotary tool holder, and having a nosepiece passageway for permitting said tool-bit to pass through said tool-bit depth limiting nosepiece passageway and protrude from said tool-bit depth limiting nosepiece;

(e) positioning means for adjusting and fixing a desired protrusion distance that said tool-bit is able to protrude from said tool-bit depth limiting nosepiece; and (f) second coupling means for rotationally coupling the drive shaft to a rearward portion of the rotary tool holder while enabling said tool-bit to slide axially in relation to the drive shaft, whereby the tool-bit depth limiting nosepiece, coupled to a forward portion of said tool holder by said first coupling means, is also able to slide axially relative to said drive shaft, thus preventing said tool-bit depth limiting nosepiece from functioning as a hard stop.

2. The rotary tool holder of claim 1 wherein said second coupling means has longitudinally extending slots for containing balls positioned within said slots, said balls being rotatably coupled to said drive shaft, and wherein said second coupling means is configured for retaining said drive shaft within said tool holder while permitting said tool holder to slide over a forward portion of said drive shaft.

3. The rotary drive shaft of claim 1 wherein said depth limiting nosepiece has screw threads thereon for enabling temporary relative rotation of said tool-bit depth limiting nosepiece relative to a forward position of said tool holder for adjustment of a desired protrusion distance that said tool-bit is able to protrude from said tool-bit depth limiting nosepiece.

4. The rotary drive shaft of claim 2 wherein said depth limiting nosepiece has screw threads thereon for enabling temporary relative rotation of said tool-bit depth limiting nosepiece relative to a forward position of said tool holder for adjustment of a desired protrusion distance that said tool-bit is able to protrude from said tool-bit depth limiting nosepiece.

5. The tool holder of claim 1 wherein at least one cutout area is formed in said nosepiece for facilitating expulsion of detrimental chips, produced during machining of said work-piece, from interior portions of said nosepiece.

6. The tool holder of claim 5 wherein a plurality of cutout areas are formed around the periphery of said nosepiece.

7. The tool of claim 6 wherein at least one of said nosepiece cutout areas extend to the front portion of the nosepiece.

8. The rotary tool holder of claim 1 wherein said nosepiece includes a bearing positioned therein for causing a nosepiece portion contacting the work-piece to stop rotating when the nosepiece is biased against a work-piece, thereby reducing potential scratching of the work-piece, and wherein an inner race of said bearing is positioned in contact with said work-piece.

9. The tool holder of claim 8 wherein a replaceable sleeve made of a non-marring material is positioned within the inner race of said bearing to further reduce any possibility of scratching of the work-piece.

10. A rotary tool holder comprising:
(a) a drive shaft configured to be rotated by a machine tool;
(b) a tool-bit holding mechanism positioned within said rotary tool holder for positioning a tool-bit within a tool-bit depth limiting nosepiece that is rigidly axially attached to a forward portion of said rotary tool holder in a manner causing said nosepiece to rotate along with said rotary tool holder;
(c) biasing means for biasing said tool-bit holding mechanism and said tool-bit in a forward direction relative to said drive shaft; and
(d) coupling means for rotationally coupling the drive shaft to a rearward portion of the rotary tool holder and configured to enable the drive shaft to slide axially in relation to the rotary tool holder, whereby the tool-bit depth limiting nosepiece, affixed to the rotary tool holder, is also able to slide axially relative to the drive shaft, thus preventing said tool-bit depth limiting nosepiece from functioning as a hard stop.

11. The rotary drive shaft of claim 10 wherein said tool-bit depth limiting nosepiece has screw threads thereon for enabling temporary rotation of said depth limiting nosepiece relative to a forward position of said tool holder for adjustment of a desired protrusion distance that said tool-bias able to protrude from said depth limiting nosepiece.

12. The tool holder of claim 10 wherein at least one cutout area is formed in said nosepiece for facilitating expulsion of detrimental chips, produced during machining of said work-piece, from interior portions of said nosepiece.

13. The tool holder of claim 12 wherein a plurality of cutout areas are formed around the periphery of said nosepiece.

14. The tool of claim 13 wherein at least one of said nosepiece cutout areas extend to the front portion of the nosepiece.

15. The rotary tool holder of claim 10 wherein said tool-bit depth limiting nosepiece includes a bearing positioned thereon for causing a nosepiece portion contacting the work-piece to stop rotating when the nosepiece is biased against a work-piece, thereby reducing potential scratching of the work-piece, and wherein an inner race of said bearing is positioned to contact said work-piece portion.

16. The rotary tool holder of claim 1 wherein said drive shaft has a bore therein for containing a portion of said tool bit for facilitating support of, and sliding of said tool bit relative to said drive shaft.

17. The rotary tool holder of claim 10 wherein said drive shaft has a bore therein for containing a portion of said tool bit for facilitating support of, and sliding of said tool bit relative to said drive shaft.

18. The tool holder of claim 15 wherein a replaceable sleeve made of a non-marring material is inserted within the inner race of said bearing to further reduce possible scratching of the work-piece.

19. A rotary tool holder comprising:
(a) a drive shaft configured to be rotated by a machine tool for in turn rotatably driving said rotary tool holder;
(b) a tool-bit holding mechanism positioned within said rotary tool holder for positioning a tool-bit within and extending from a passageway of a tool-bit depth limiting nosepiece, said nosepiece being rigidly axially attached by a first coupling means to a forward portion of said rotary tool holder in a manner causing said nosepiece to rotate along with said rotary tool holder;
(c) biasing means for biasing said tool holder and said tool-bit away from said drive shaft in a forward direction extending toward a work-piece;
(d) second coupling means for rotationally coupling the drive shaft to the rotary tool holder while configured to enable a rear portion of said tool-bit to slide axially within a bore of the drive shaft, whereby the tool-bit depth limiting nosepiece, rigidly coupled to said tool holder, is able to slide axially relative to said drive shaft, thus preventing said tool-bit depth limiting nosepiece from functioning as a hard stop; and
(e) wherein said second coupling means has longitudinally extending slots for containing balls positioned within said slots, said balls being rotatably coupled to said drive shaft, and wherein said second coupling means is configured for retaining said drive shaft within said tool holder; and
(f) wherein said first coupling means has screw threads for enabling temporary relative rotation of said nosepiece with respect to a forward position of said tool holder, for providing adjustment of a given desired protrusion distance that said tool-bit is able to protrude from said nosepiece.

20. The rotary tool holder of claim 19 wherein said tool-bit depth limiting nosepiece includes a bearing positioned therein for enabling a nosepiece portion contacting the work-piece to stop rotating when the nosepiece is biased against a work-piece, thereby reducing potential scratching of the work-piece and wherein an inner race of said bearing is positioned to contact a work-piece when the nosepiece is biased against the work-piece to deter any possibility of scratching of the work-piece.

* * * * *